(12) United States Patent
Wang et al.

(10) Patent No.: US 7,961,177 B2
(45) Date of Patent: Jun. 14, 2011

(54) INPUT PEN STORAGE

(75) Inventors: Ching-Cheng Wang, Taoyuan Hsien (TW); Jung-Wen Chang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1440 days.

(21) Appl. No.: 11/418,175

(22) Filed: May 5, 2006

(65) Prior Publication Data
US 2007/0188479 A1    Aug. 16, 2007

(30) Foreign Application Priority Data
Feb. 14, 2006  (TW) .............................. 95202530 U

(51) Int. Cl.
*G09G 5/00* (2006.01)
(52) U.S. Cl. ......... 345/179; 345/182; 345/169; 345/156
(58) Field of Classification Search .................. 345/179, 345/182, 169, 156
See application file for complete search history.

(56) References Cited

U.S. PATENT DOCUMENTS
5,635,959 A * 6/1997 Takeuchi et al. ............. 345/179
2006/0262419 A1* 11/2006 Harada ........................ 359/656

FOREIGN PATENT DOCUMENTS
JP    2003-223269    * 8/2003

* cited by examiner

*Primary Examiner* — Richard Hjerpe
*Assistant Examiner* — Leonid Shapiro
(74) *Attorney, Agent, or Firm* — Rabin & Berdo, PC

(57) ABSTRACT

An input pen storage includes a pen holding part coupled to an input pen; a loader having an arm having a pen constraining part for constraining the pen holding part; an obstruct member for expanding the arm; an extendable lock mechanism having an extension state and a return state for constraining a base holding member on the loader; and a forcing member exerting an outward force on the loader. When the loader is displaced to a hold position to change the extendable lock mechanism from the extension state to the return state, the pen constraining part constrains the pen holding part and the extendable lock mechanism constrains the base holding member so that the input pen is held firmly along with the loader.

18 Claims, 3 Drawing Sheets

INPUT PEN STORAGE

RELATED APPLICATIONS

The present application is based on, and claims priority from, Taiwan Application Serial Number 95202530, filed on Feb. 14, 2006, the disclosure of which is hereby incorporated by reference herein in its entirety.

BACKGROUND

1. Field of Invention

The present invention relates to an input pen storage, and more particularly, to the input pen storage applicable to a portable electronic apparatus.

2. Description of Related Art

Recently, with the rapid development of electronic industry, the varieties of information products are frequently updated and renewed from the old ones, and various electronic information products with user-friendly operation have also been presented to the market constantly, such as desktop computers, laptop computers, PDAs (Personal Digital Assistant) or tablet PCs (Personal Computers), etc. Besides traditional methods using button-keys (such as a mouse or a keyboard), most information products are integrated with a new input technique, i.e. the method using a touch-control panel with hand writing input, thereby making the data input and control more convenient for use.

A product with hand writing input and touch-control input is usually equipped with an input pen used for performing an input action. Based on a conventional technique, the input pen is received in such as a grove disposed on a surface of the main body of an electronic apparatus, and is clamped via an interference method; or the input pen is received in a cavity formed in the main body of the electronic apparatus with an opening formed on the surface thereof, and is also clamped in the cavity via an interference method However, by using the aforementioned methods to receive the input pen, a user has to exert a pulling force to release the input pen from an interfered state when the input pen is desired to be taken out, thus causing quite a lot of inconvenience.

SUMMARY

Hence, an aspect of the present invention is to provide an input pen storage for holding an input pen in an electronic apparatus.

Another aspect of the present invention is to provide an input pen storage for allowing a user to position or take out the input pen briefly via a simple push action.

Still another aspect of the present invention is to provide an input pen storage having the function of showing the user the position state of the input pen.

In accordance with the aforementioned aspects, the present invention provides an input pen storage comprising a pen holding part, a loader, an obstruct, a base holding member, an extendable lock mechanism and a forcing member, wherein the pen holding part is coupled to an input pen, and the loader includes a base and an arm disposed on the base, the arm having an expansion part and a pen constraining part used for constraining the pen holding part. The obstruct member is used for contacting the expansion part so as to expand the arm, and the base holding member is coupled to the base. The extendable lock mechanism has two secured states, i.e. an extension state and a return state. At the return state, the base holding member is constrained. The forcing member exerts an outward force on the loader.

When the input pen resists the outward force and moves the loader for displacing the input pen together with the loader, the expansion part escapes being expanded by the obstruct member, thereby enabling the arm to generate a return movement so that the pen constraining part constrains the pen holding part; and when the loader is displaced to a hold position, the base holding member contacts the extendable lock mechanism, whereby the extendable lock mechanism is changed from the extension state to the return state and the extendable lock mechanism constrains the base holding member so as to hold the input pen firmly along with the loader.

The present invention not only can receive an input pen in an electronic apparatus by using a method without friction loss, but also provides a brief operation (i.e. push and press method) for allowing a user to secure or release the input pen, thereby making the product more user-friendly and convenient, and an indication function showing the input pen received in a correct state further increase the effectiveness of the input pen storage.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
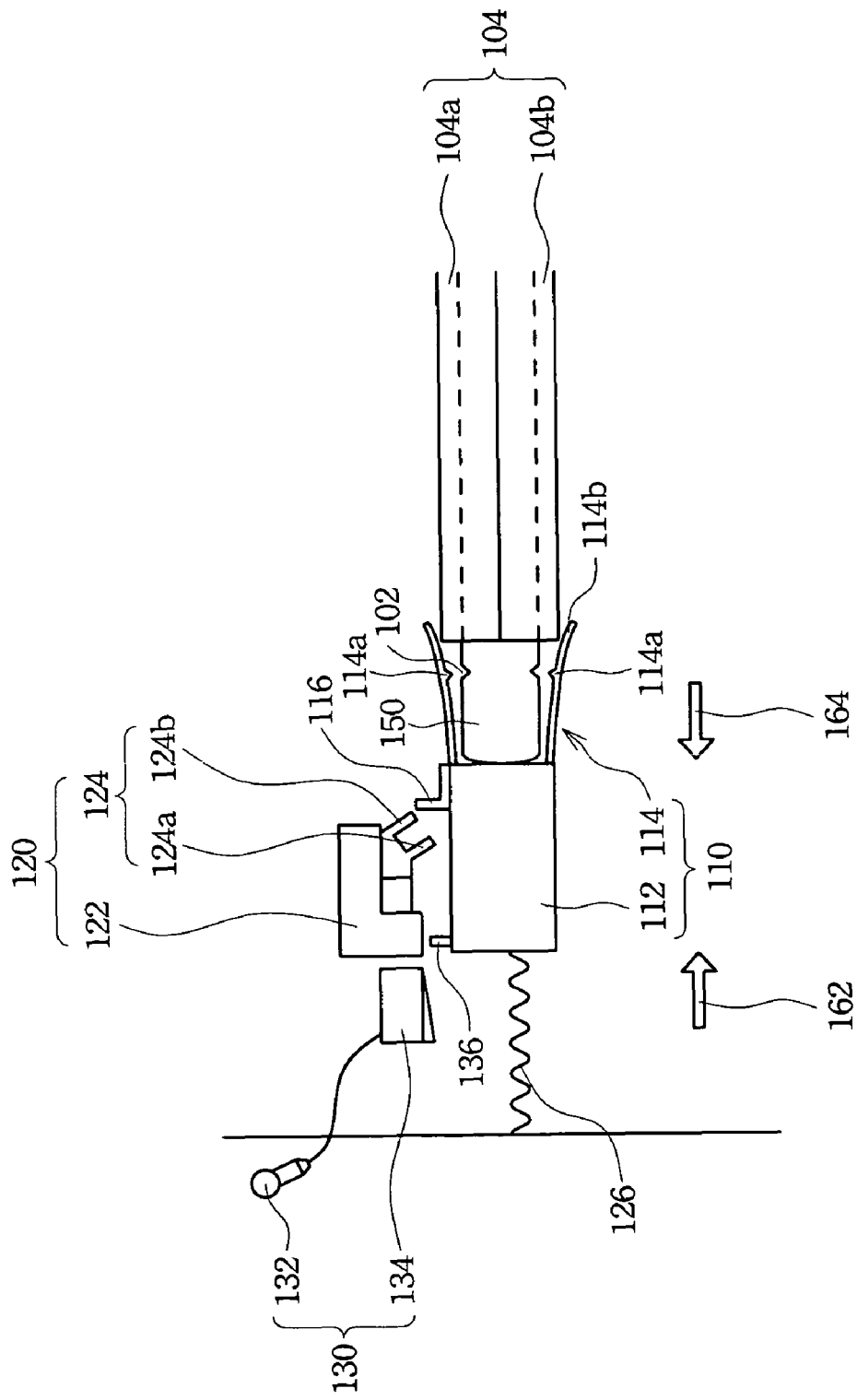
FIG. 1A is a schematic diagram showing an input pen storage in which the holding function is not activated yet, according to a preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention discloses a device used for holding and integrating an input pen in an electronic product. The present invention not only can provide a user-friendly retrieving function push-press function for taking out the input pen, but also can receive the input pen with constraints for avoiding damaging the surface of the input pen. Further, the present invention also provides an indication function for allowing the user to be aware of the message regarding the position state of the input pen.

Figure 1B:
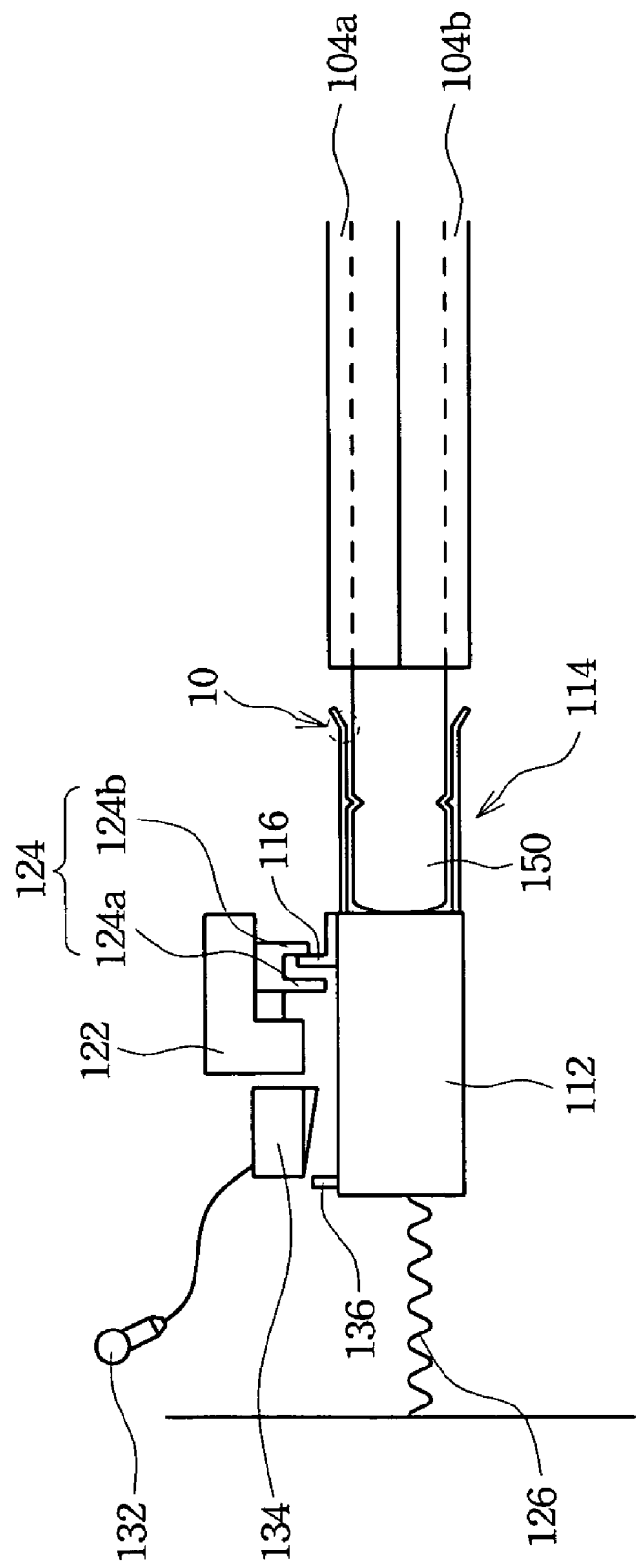
FIG. 1B is a schematic diagram showing the input pen storage in which the holding function has been activated, according to the preferred embodiment of the present invention.

Referring to FIG. 1A and FIG. 1B, FIG. 1A and FIG. 1B are schematic diagrams showing an input pen storage in which the holding function is not activated or has been activated respectively, according to a preferred embodiment of the present invention. The input pen of the present invention comprises a pen holding part 102, a loader 110, an obstruct 104, a base holding member 116, an extendable lock mechanism 120 and a forcing member 126.

In the preferred embodiment of the present invention, the pen holding part 102 is coupled to an input pen 150, and the loader 110 includes a base 112 and an arm 114, the forcing member 126 exerts an outward force on the base 112, and the arm 114 is coupled to the base 112. The arm 114 has a pen constraining part 114a and an expansion part 114b, wherein the pen constraining part 114a is used for constraining the pen holding part 102 so as to make the input pen 150 at a secure state relative to the loader 110.

When only the outward force from the forcing member 126 is exerted on the loader 110 and no other external forces (such as the force from the input pen 150) are exerted thereon, the arm 114 is situated at a state of contacting the obstruct 104 via the expansion part 114b, and is expanded thereby.

When an external force is exerted on and moves the loader 110, the arm 114 escapes being expanded by the obstruct 104 and returns to its original position, and meanwhile the pen constraining part 114a is also displaced to constrain the pen holding part 102, wherein, in the present embodiment, the arm 114 can be such as a set of plate springs.

Moreover, the base holding member 116 is disposed on the base 112. The extendable lock mechanism 120 has two different secured states for constraining or releasing the base holding member 116. Herein, those secured states are called an extension state and a return state respectively. When being at the return state, the base holding member 116 is constrained.

Hereinafter, the interactive movements between the base holding member 116 and the extendable lock mechanism 120 are explained. When moving a predetermined distance along with the base 112 in the direction (i.e. a push-in direction 164) opposite to a push-out direction 162 so as to contract the extendable lock mechanism 120, the base holding member 116 exerts a force on and changes the extendable lock mechanism 120 to the return state, wherein the extendable lock mechanism 120 to the return state constrains the base holding member 116.

Figure 2:
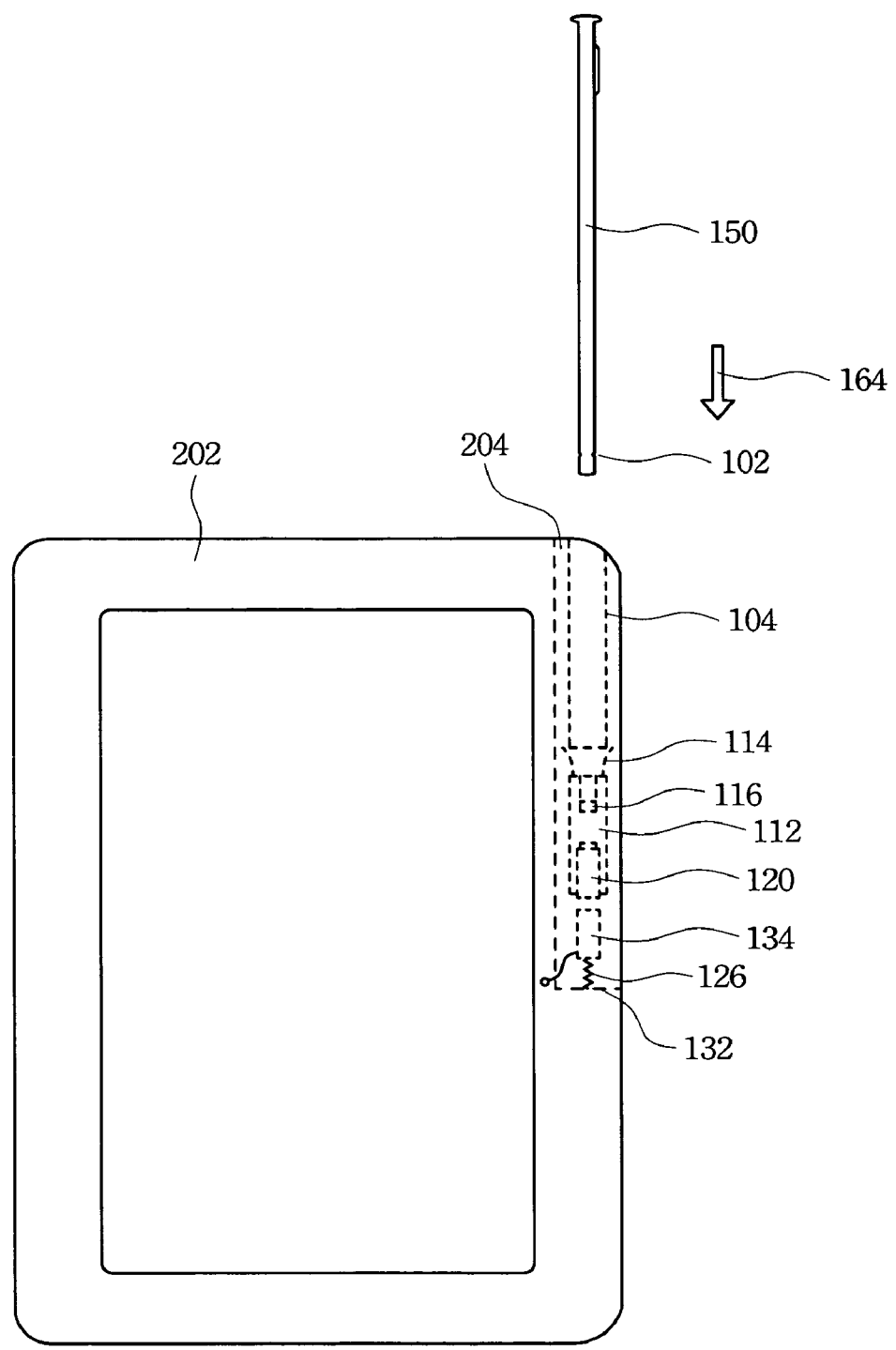
FIG. 2 is a schematic diagram showing the input pen storage of the present invention applied in a tablet PC.

Then, referring to FIG. 2 simultaneously, FIG. 2 is a schematic diagram showing the input pen storage of the present invention applied in a tablet PC. In this preferred embodiment, the input pen storage of the present invention is disposed in a cavity 204 of a tablet PC main body 202, wherein the obstruct 104 includes an upper cover 104a and a lower cover 104b both defining a cylindrical member with a hollow structure for allowing the input pen to be received therein, wherein the diameter of the cylindrical member is slightly greater than that of the input pen 150, thereby preventing friction from being generated when the input pen 150 passes through the cylindrical member. The aforementioned cylindrical member with the hollow structure can be a monolithic structure, and is not limited to the assembly of the upper cover and the lower cover.

The number of the elements forming the arm 114 is two, and the arm 114 extends from the surface of the base 112. Preferably, the expansion part 114b of the arm 114 is designed as being curved (i.e. the curvature thereof is changed.), so that the obstruct 104 will be expanded more easily.

The pen holding part 102 is a recessed portion at a predetermined position of the input pen 150, and the pen constraining part 114a is designed as a protrusive portion corresponding thereto for performing a constraining function. The extendable lock mechanism 120 can be such as an extendable fastener (model number: F091YA) made by TIFCO (Taiwan Industrial Fastener Corporation), which is a fastener with two securing positions respectively corresponding to FIG. 1A and FIG. 1B.

The extendable fastener comprises a main body 122 and an extendable member 124. The extendable member can perform a movement relative to the main body 122 for being selectively secured at two different positions, i.e. moving from an extension state to a return state.

The extendable member 124, used for performing the function of constraining the base holding member 116, comprises a push portion 124a and a locking portion 124b. The functions of locking and releasing the fastener are triggered by pressing the extendable member 124, wherein, when the return state of the extendable member 124 is corresponding to the locking function; and the extension state thereof is corresponding to the releasing function.

The forcing member 126 can be an elastic member (such as a spring); and also can be a set of repulsive magnets, wherein one magnet is connected to the base, and the other magnet is opposite thereto for generating repulsion.

In FIG. 1A, the input pen 150 is not under the state of being received in (hold state). Since the forcing member 126 exerts a push-out force in the push-out direction 162, the entire loader 110 is balanced between the forcing member 126 and the obstruct 104. When the arm 114 is expanded by the obstruct 104, the pen constraining part 114a does not constrain the pen holding part 102 any more, so that the extendable lock mechanism 120 is at the extension state.

When a push-in force via the input pen 150 is exerted on the loader 110 in push-in direction 161, the loader 110 is displaced along the push-out direction 164. Meanwhile, the arm 114 also has a bending displacement, so that the pen constraining part 114a of the arm 114 returns to the state of constraining the pen holding part 102. If the push-in force is kept being exerted, the base holding member 116 moving together with the loader 119 will contact the push portion 124a of the extendable fastener, thereby further pushing extendable fastener to the return state.

While the extendable lock mechanism 120 is changed from the extension state to the return state, the locking portion 124b is also displaced similarly and eventually constrains the base holding member 116. At this time, if the push-in force is removed, the base 112 will be displaced along the push-out direction 162 due to the forcing member 126.

The locking portion 124b under the return state (secure state) provides the base holding member 116 a force resisting the push-out force, so that the base holding member 116 together with the loader 110 are balanced between the forcing member 126 and the locking portion 124b, such as shown in FIG. 1 B. Thus, the loader 110 together with the pen holding part 102 and the input pen 150 are firmly held.

Similarly, when the input pen 150 is desired to be released from a hold state, the push-in force is again exerted on the input pen 150, so as to force the base holding member 116 to contact the push portion 124a for triggering the releasing effect of the extendable fastener. Meanwhile, since the extendable member 124 is changed to the extension state, no resistant force is provided to base holding member 116, so that the loader is pushed outwards by the forcing member 126, thus releasing the input pen 150.

Since the extendable lock mechanism 120 has the feature of switching between two positions, the function of holding/receiving or releasing can be achieved merely by pressing the input pen 150, and thus is quite convenient and brief for the user.

The aforementioned pen holding part is a recessed portion directly formed on the input pen, but also can be an object having the same recessed portion (such as a pen cap) fixed on the input pen. When the input pen is received, the pen cap is mounted on the input pen, thus making the pen holding part and the input pen as an integral body. The pen holding part also can be a protrusive structure, and the pen constraining part can be a recessed structure correspondingly, wherein one of the ordinary skill in the art can easily learn this variation.

Further, the input pen storage comprises a detection indicator unit 130. When the loader 110 moved to a trigger position, the detection indicator unit 130 is triggered by the loader 110 to generate an indication action, such as light-on or light-off. The trigger position can be designed as the position (i.e. the hold position) at which the loader 110 changes the extendable lock mechanism 120 to the return state; or a position in the receiving cavity 204 deeper than the hold position.

In the preferred embodiment of the present invention, the detection indicator unit comprises a trigger sensor 134 and an indication device electrically connected thereto. The trigger sensor 134 uses the detection of the loader 110 moving to the trigger position as a triggering condition. When the triggering condition is met, the detection indicator unit 130 is controlled to perform an indication action. The detection indicator unit 130 can be such as a light sensor and an indicating lamp electrically connected thereto. When the loader is moved to the trigger position, the light sensor issues a signal to the indicating lamp, thereby turning on the indicating lamp for showing the user the situation of the input pen held in an electronic apparatus.

The detection indicator unit 130 can be such as a dip switch electrically connected to the indicating lamp (for example, a LED (Light-Emitting Diode) lamp), and a triggering part 136 (such as the structure protruding from the surface of the base 112 shown in FIG. 1A and FIG. 1B) is formed on the base 112 of the loader 110 for triggering the dip switch.

In the present embodiment, the combination of the dip switch and the LED lamp is used as the detection indicator unit 130. When the input pen storage is at the state as shown in FIG.1A, the dip switch is at an off mode, and thus the indicating lamp is off. When the input pen 150 exerts a force pushing the loader 110 inwards for displacing the triggering part 136 to contact the dip switch (such as shown in FIG. 1B), the dip switch is tipped by the triggering part 136 and is switched to another mode, i.e. an on mode. Meanwhile, the indicating lamp replies to the switch state of the dip switch and is turned on for letting the user know that the input pen has been correctly held in. The aforementioned triggering part 136 also can be a monolithic structure in which the base is integrated. For example, the surface of the base is gradually lifted in the direction opposite to the push-out force from the forcing member, thereby tipping the dip switch back and forth.

The input pen storage of the present invention is also applicable to other electronic apparatuses, such as a display or an apparatus main body integrated in a desktop computer or laptop computer, which all fall within the spirit and scope of the present invention.

It can be known from the preferred embodiments of the present invention that the application of the present invention has the following advantages. Via the efficacy of the pen constraining part constraining the pen holding part, the present invention can prevent the friction loss caused by using the interference method to secure the input pen, i.e. the loader is pushed to indirectly control the state of input pen constrained by the arm, thereby eliminating the path along which the input pen is rubbed to cause friction loss while being received in.

Further, the push and press method used for releasing and automatically ejecting the input pen has provided the user a method different from the conventional method in which quite a lot of strength has to be used to pull out the input pen, thereby making the product operation more friendly and convenient. The detection unit combined in the input pen storage further assures that the input pen is correctly received in the apparatus, thus avoiding the possibility of falling out.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An input pen storage, comprising:
    a pen holding part coupled to an input pen;
    a loader, comprising:
        a base; and
        an arm disposed on one side of the base for receiving one end of the input pen, the arm having a protrusive portion used for constraining the pen holding part and the input pen;
    a cylindrical member used for contacting and expanding the arm, the cylindrical member having a hollow structure for receiving the input pen and exposing the one end of the input pen;
    a base holding member coupled to the base;
    an extendable fastener having an extension state and a return state for constraining the base holding member; and
    a forcing member connected to the other side of the base opposite to the arm for exerting an outward force on the one end of the input pen;
    wherein, when the one end of the input pen resists the outward force and moves the loader for displacing the input pen together with the loader, the arm escapes being expanded by the cylindrical member, thereby generating a return movement so that the pen constraining part constrains the pen holding part; and when the loader is displaced to a hold position, the base holding member contacts the extendable fastener, whereby the extendable fastener is changed from the extension state to the return state and the extendable fastener constrains the base holding member so as to hold the input pen firmly along with the loader.

2. The input pen storage of claim 1, wherein the extendable fastener comprises:
    a main body; and
    an extendable member having an extension state and a return state relative to the main body, wherein, when the extendable member is at the return state relative to the main body, the base holding member is constrained.

3. The input pen storage of claim 2, wherein the extendable member comprises a push portion and a locking portion, and the locking portion provides the base holding member with a resistance force for resisting the outward force, when the push portion is pushed by the base holding member for making the extendable member show the return state.

4. The input pen storage of claim 1, wherein the arm is curved.

5. The input pen storage of claim 1, wherein the forcing member is an elastic member or a set of repulsive magnets.

6. The input pen storage of claim 1, further comprising a detection indicator unit, wherein the detection indicator unit generates an indication when the loader is moved to a trigger position.

7. The input pen storage of claim 6, wherein the detection indicator unit comprises:
   a light sensor; and
   an indicating lamp electrically connected to the light sensor, wherein the light sensor issues a signal to the indicating lamp when the loader is moved to the trigger position.

8. The input pen storage of claim 6, wherein the detection indicator unit comprises:
   an indicating lamp; and
   a dip switch electrically connected to the indicating lamp for controlling the on/off of the indicating lamp in accordance with a switch state, wherein the loader contacts the dip switch to change the switch state of the dip switch for turning on or off the indicating switch when the base is moved to a trigger position.

9. An input pen storage, comprising:
   a pen holding part coupled to an input pen;
   a loader, comprising:
      a base; and
      an arm disposed on one side of the base for receiving one end of the input pen, the arm having an expansion part and a pen constraining part used for constraining the pen holding part;
   an obstruct member for contacting the expansion part so as to expand the arm, the obstruct member having a hollow structure for receiving the input pen and exposing the one end of the input pen;
   a base holding member coupled to the base;
   an extendable lock mechanism having an extension state and a return state for constraining the base holding member; and
   a forcing member connected to the other side of the base opposite to the arm for exerting an outward force on the one end of the loader;
   wherein, when the one end of the input pen resists the outward force and moves the loader for displacing the input pen together with the loader, the expansion part escapes being expanded by the obstruct member, thereby enabling the arm to generate a return movement so that the pen constraining part constrains the pen holding part; and when the loader is displaced to a hold position, the base holding member contacts the extendable lock mechanism, whereby the extendable lock mechanism is changed from the extension state to the return state and the extendable lock mechanism constrains the base holding member so as to hold the input pen firmly along with the loader.

10. The input pen storage of claim 9, wherein the pen holding part is a recessed portion, and the pen constraining part is a protrusive portion.

11. The input pen storage of claim 9, wherein the extendable lock mechanism is an extendable fastener comprising:
    a main body; and
    an extendable member having an extension state and a return state relative to the main body, wherein, when the extendable member is at the return state relative to the main body, the base holding member is constrained.

12. The input pen storage of claim 11, wherein the extendable member comprises a push portion and a locking portion, and the locking portion provides the base holding member with a resistance force for resisting the outward force, when the push portion is pushed by the base holding member for making the extendable member show the return state.

13. The input pen storage of claim 9, wherein the expansion part is curved.

14. The input pen storage of claim 9, wherein the forcing member is an elastic member or a set of repulsive magnets.

15. The input pen storage of claim 9, further comprising a detection indicator unit, wherein the detection indicator unit generates an indication when the loader is moved to a trigger position.

16. The input pen storage of claim 15, wherein the detection indicator unit comprises:
    a light sensor; and
    an indicating lamp electrically connected to the light sensor, wherein the light sensor issues a signal to the indicating lamp when the loader is moved to the trigger position.

17. The input pen storage of claim 15, wherein the detection indicator unit comprises:
    an indicating lamp; and
    a dip switch electrically connected to the indicating lamp for controlling the on/off of the indicating lamp in accordance with a switch state, wherein the loader contacts the dip switch to change the switch state of the dip switch for turning on or off the indicating switch when the base is moved to a trigger position.

18. The input pen storage of claim 17, further comprising a triggering part connected to the base for contacting the dip switch.

* * * * *